Patented Oct. 2, 1951

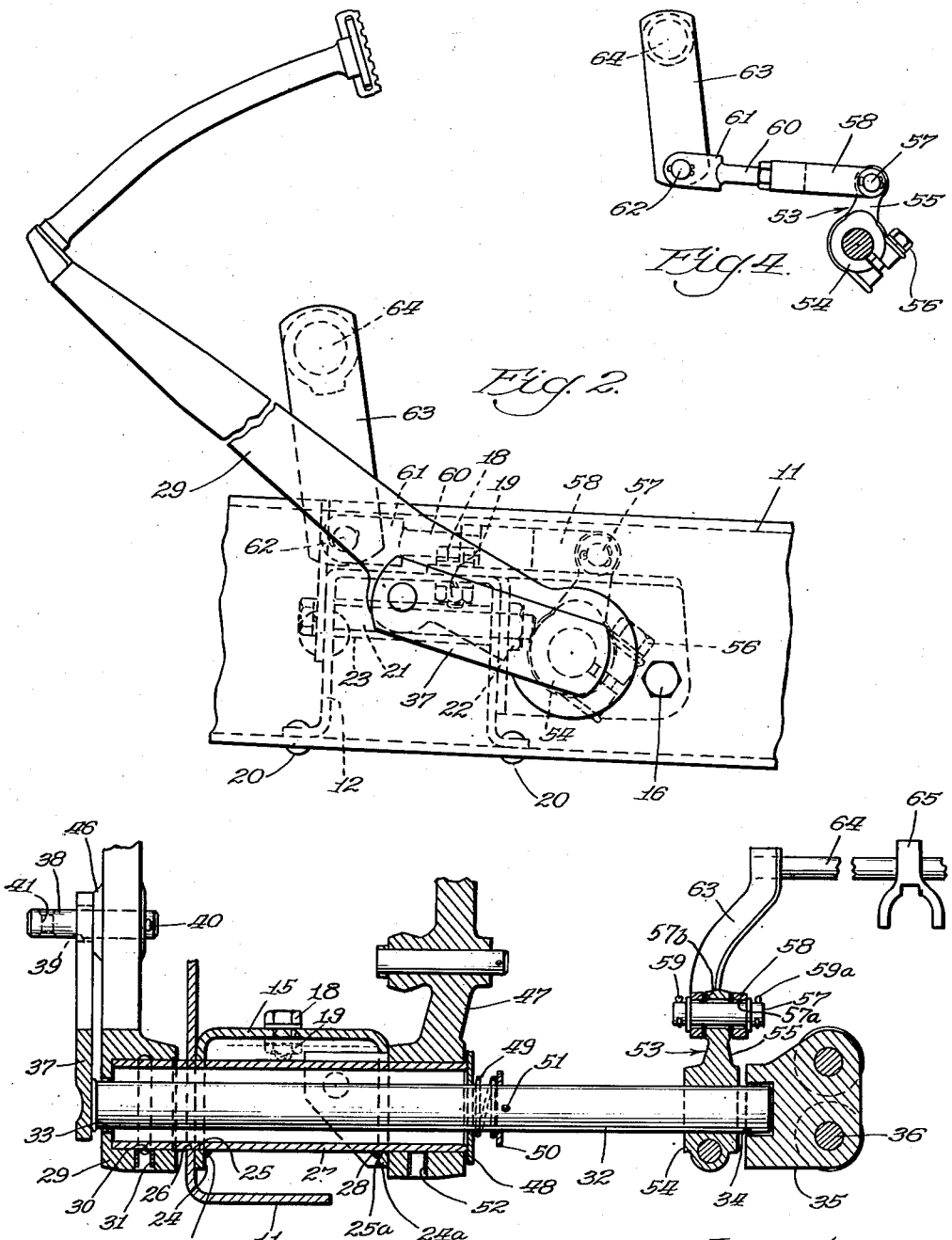

2,569,633

UNITED STATES PATENT OFFICE 2,569,633

FRAME AND ENGINE SUPPORTS FOR CLUTCH CONTROL MECHANISM

Joseph A. Hausmann and Earl T. Riedy, Fort Wayne, Ind., assignors to International Harvester Company, a corporation of New Jersey Application February 14, 1948, Serial No. 8,377

6 Claims. (Cl. 180—64)

This invention relates to a clutch actuating and disengaging mechanism, and more particularly to a clutch control means for a resiliently mounted power plant such as is used in motor vehicles.

Ever since the advent of the resiliently mounted power plants in motor vehicles the problem of transmitting controlling motion between the clutch pedal and clutch throwout mechanism, while simultaneously maintaining a chatter-free clutch, has received considerable attention in the industry. Because the clutch control or pedal member was usually transversely mounted, with respect to the axis of oscillation as well as the fore and aft movement of the power plant, on the frame, while the clutch throw-out lever remained positioned within the clutch housing formed as a unitary structure with the resiliently mounted power plant, there resulted considerable relative movement between these members which, of course, substantially complicated the installation of a positive connecting means therebetween. In many instances the devices proposed assumed the form of either a resilient element interposed in a linkage mechanism, or of a plurality of highly flexible motion-accommodating interconnecting linkage members that endeavored to accommodate such movements and eventually dissipate them.

Of the many such constructions heretofore proposed only a relatively small number have met with favor and continue to be presently used in the industry. This factor alone serves to emphasize the necessity for a more satisfactory solution to this perplexing problem and to accentuate the failure and inability of previous designs to overcome the inherent difficulties encountered in such mechanisms.

The present invention, therefore, is directed to a novel, simple, inexpensive and highly effective control means between a clutch pedal and a clutch throw-out member that will accomplish the two fold objective of permitting a resiliently mounted power plant to freely oscillate and, simultaneously therewith, move fore and aft along a longitudinal axis, without transmitting such motions, and the objectionable chatter resulting therefrom, to the clutch pedal.

It is another important object of this invention to provide a stationary and pivotally mounted clutch pedal that connects by means of lost-motion linkage with the clutch throw-out mechanism affixed to a resiliently mounted vehicle power plant.

Another important object of this invention is to provide a positive linkage connection between a clutch control pedal and a clutch throw-out mechanism that will avoid transmission, in a direction reverse to its ordinary mode of operation, of the oscillatory and fore and aft motion produced in the clutch-throw-out mechanism during operation of an associated and resiliently mounted vehicle power plant.

Another object is to provide a clutch control mechanism for a resiliently mounted vehicle power plant wherein a clutch control pedal pivotally mounted for angular movement on a vehicle frame, substantially transversely to the oscillation axis of the vehicle power plant, connects through a novel form of lost-motion linkage mechanism to a clutch throw-out member in such manner that positive control motion may be transmitted through said linkage when the actuating force is applied to the clutch pedal, but, by virtue of the lost-motion feature thereof, the oscillatory and fore and aft motion of the vehicle power plant will not be transmitted to the clutch pedal.

A further object is to provide a clutch control mechanism for a resiliently mounted vehicle engine or power plant wherein a clutch pedal pivotally mounted on a supporting frame is releasably connected by means of a rotating crank member through a semiflex type of shaft and intermediate linkage to a clutch throw-out member associated with said resiliently mounted engine or power plant.

A still further object is to provide a type of lost-motion linkage connection between a clutch pedal and a clutch throw-out lever on a resiliently mounted vehicle power plant that permits positive transmission of rotating control motion therethrough in one direction, but prohibits transmission of the oscillatory and fore and aft motion, produced by the resiliently mounted power plant, therethrough in the opposite direction.

A yet still further object is to provide a novel type of lost-motion linkage connection between a clutch pedal and a clutch throw-out lever on a resiliently mounted vehicle power plant that is particularly adaptable for installations wherein the clutch pedal member is pivotally mounted outside the supporting side frame channels of the vehicle.

These and other objects, features and advantages of the present construction will be apparent from the full description, reference being had to the accompanying drawings wherein a preferred form of the invention is clearly shown.

Fig. 2 is a side elevation of the clutch control pedal and a portion of its associated mechanism mounted on the outer side of the vehicle frame.

Fig. 3 is a sectional view taken along line 3—3 of Fig. 1. (Coil booster spring not shown.)

Fig. 4 is a sectional view taken along line 4—4 of Fig. 1.

Figure 1:
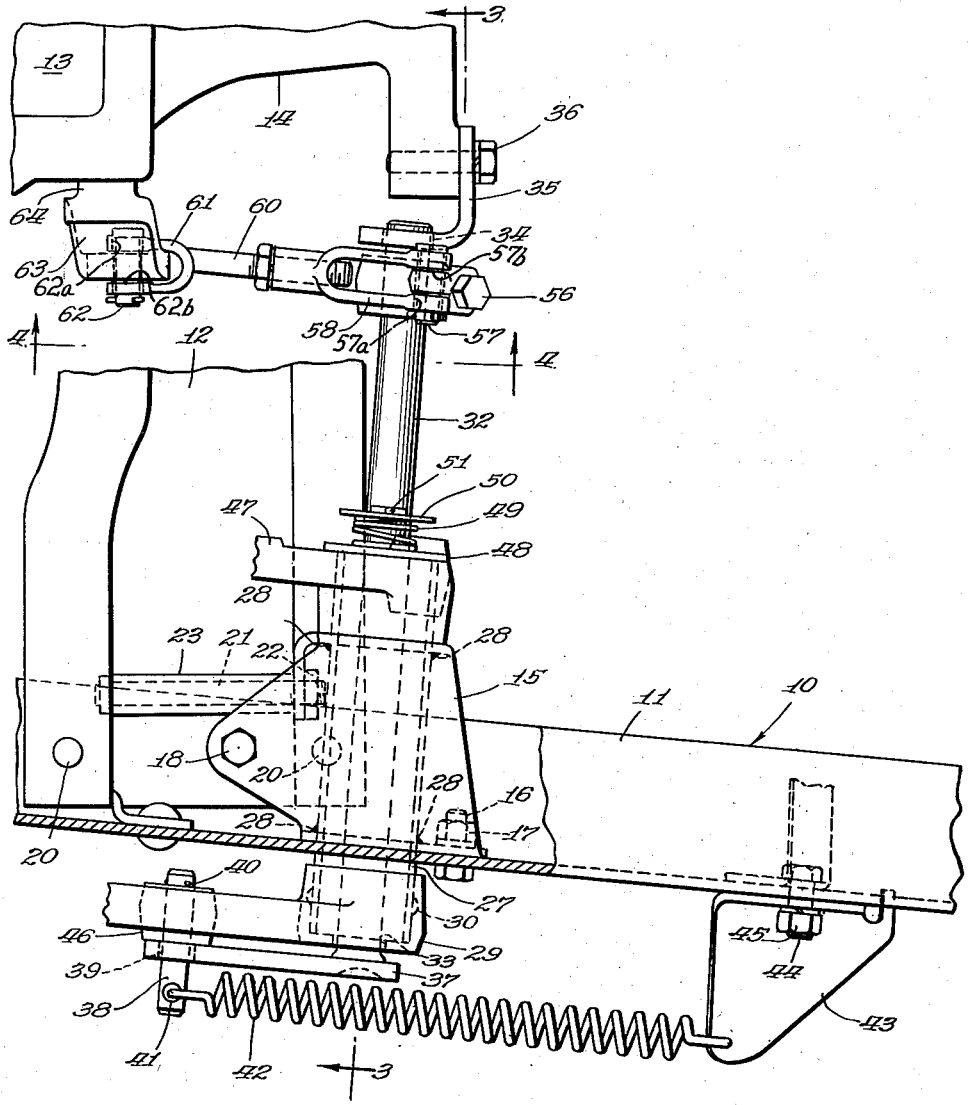
Fig. 1 is a top plan view, with part of the upper flange of the vehicle frame broken away to better illustrate the arrangement, of the clutch control mechanism constructed in accordance with this invention.

By referring to the drawings, it will be noted that a vehicle chassis or frame has been indicated generally by the numeral 10. In the conventional motor vehicle frame complementary channel-like side rail members 11 (only one of which has been shown) are rigidly interconnected by a plurality of cross members, such as the one indicated at 12. A vehicle power plant or engine, the outline of a portion of which is shown and indicated by the numeral 13, is resiliently mounted on the cross member 12 and further supported at its forward end (not shown) in accordance with conventional mounting practices. Since such features form no specific part of the present invention, the details thereof have not been otherwise amplified in the drawings. Clutch and transmission housing, fashioned integral with the engine, is indicated at 14.

A bracket member 15 is fixedly secured to the side frame channel 11, by suitable means such as the bolt 16 and nut 17, and to the cross member 12 (Fig. 2) preferably by the bolt 18 and nut 19. Cross member 12, in turn, is fixedly mounted on channel frame member 11, by suitable securing means such as a plurality of rivets 20. Additional support for the bracket 15 may be obtained by means of the bolt 21, nut 22, and spacer sleeve 23 which rigidly affixes said bracket to the frame cross member 12. Depending, and spaced apart, flange portions 24 and 24a, on the bracket 15, are fashioned with apertures 25 and 25a aligned with an aperture 26 in the vertical web of the side rail channel 11. A tubular bearing sleeve 27 provided with a smoothly finished exterior surface, is positioned within the apertures 25, 25a, and 26, and secured to the bracket 15, preferably by welding, at a plurality of points as indicated by the numeral 28 (Figs. 1 and 3). A portion of the sleeve 27, projecting outside the side rail channel 11, has pivotally mounted thereon a clutch pedal member 29 which, after mounting, is free to rotate in angular movement about the outer periphery of said sleeve. An annular groove 30 (Fig. 3) around the inner periphery of the hub portion of the said pedal member facilitates lubrication of its contacting surfaces, and an opening 31 connecting with said groove 30 may, if desired, be equipped for attachment of a conventional type pressure lubrication fitting.

A shaft 32, loosely positioned within the sleeve 27, is supported on one end in an aperture 33 in the hub portion of the clutch pedal member 29, and on the opposite end in an aperture 34 in the bearing bracket 35, which, in turn, is secured by stud bolts 36 to an extension of a portion of the power plant housing 14 shown in the drawings as an integral part of the vehicle power plant 13. The openings 33 and 34, in pedal member 29 and bracket 35 respectively support opposite ends of the shaft 32 and are made slightly larger than the diameter of said shaft in order to maintain the loose fit, previously mentioned, for the shaft mounted therein. Fixedly mounted on the outer end of shaft 32 is a flat link 37, in turn connected at its opposite end to a stud pin 38 mounted on the clutch pedal member 29 and loosely positioned within the opening 39 in said link. A cotter pin 40 is provided on one end, to retain said pin 38 in position, while the opposite end of said pin has a transverse opening 41 adapted for anchoring one end of the booster coil spring 42, the opposite end of which is anchored in a bracket 43 in turn secured by suitable means, such as the bolt 44 and nut 45, to the side rail channel 11.

A spacing shim 46 fashioned either as a flat annular ring adapted to be placed over the pin 38, or, as an integral portion of the clutch pedal member 29, may be provided to maintain the desired spacing between said member and the link 37.

A brake pedal assembly, indicated generally by the numeral 47, of substantially conventional design and adapted for rotatable mounting, is positioned on the bearing sleeve 27 near the end opposite that upon which the clutch pedal member is mounted. The hub portion of said brake pedal 47 is arranged so as to abut, in slidable relationship, the outside vertical face of depending flange 24a, on the bracket 15, while the inside edge of the hub is positioned flush with the inner marginal edge of said sleeve, and may be rotatably retained thereagainst by suitable means, such for instance, as the assembly comprising the retaining washer 48 against which presses the spring 49 in turn held in place by the washer 50 and cotter pin 51 positioned in the shaft 32. An opening 52 in the hub of said brake pedal assembly 47 may, if desired, be equipped with a conventional type high pressure lubricating fitting.

Mounted on the inner end of shaft 32, and spaced from the bracket 35, is a crank 53 having a split hub portion 54, and an upwardly extending arm 55. A stud bolt 56 may be used to draw tightly together the split portions of said hub so that said crank may be securely affixed to said shaft. The upwardly extending arm 55, on the crank 53, is loosely attached by a pin 57 as indicated at 57a and 57b to the Y-end of a turnbuckle yoke 58 which rotatably straddles said arm. Cotter pins 59 and 59a positioned in opposite ends of said pin serve to retain said pin and prevent it from working loose and slipping out of position. The opposite end of yoke 58 is connected by a threaded rod 60 to another yoke 61, to which said rod is angularly and rigidly secured, and in turn loosely attached by a pin 62 as indicated at 62a and 62b to one end of a curved crank 63, the opposite end of which is secured by conventional means such as production welding, to the clutch throw-out shaft 64 and its associated forked operating mechanism 65 (Fig. 3).

*Operation*

When the clutch pedal 29 is depressed, as by pressure thereon from the vehicle operator, it rotates about the tubular sleeve member 27 and carries with it the pin 38 and loosely mounted link 37. As this link rotates about an axis substantially through the center of the sleeve member, and since it is rigidly affixed to one end of the loosely mounted shaft 32, said shaft will likewise rotate in a counter-clockwise direction, as viewed in the attached drawings. Rotation of this shaft in turn actuates the attached crank 53, which, upon movement, carries with it the connecting turn-buckle linkage 58, 60 and 61, and the curved link member 63. Since one end of the curved link member 63 is securely affixed to the clutch throw-out shaft 64 a sufficient movement thereof will, of course, disengage the clutch mechanism 65 disposed within the housing 14. As the clutch pedal is depressed the booster coil spring 42, attached at one end to the pin 38, pivots about a fulcrum in its anchor bracket 43 and, since it is an over-center mounted type, immediately begins to contract; thus assisting the vehicle operator in overcoming the opposed pressures caused by the engaging and holding springs in the clutch assembly.

Upon release of the clutch pedal by the vehicle operator, said spring 42 will tend to hold said pedal in its downward position, but since the springs in the clutch are so much more powerful, its holding power will be overcome and the clutch pedal will return to its initial position, while the spring 42 again will be slightly extended. Coincident with this release a series of operations, reverse to that previously described and functioning through the connected linkage, will ensue; resulting ultimately in returning the curved link 63 to its initial position wherein the clutch mechanism 65 disposed within the housing 14 assumes an engaged relationship.

Since the vehicle power plant is resiliently mounted on the vehicle chassis, it will be understood, that, in accordance with well-known principles, as the speed of the engine or of the vehicle varies, as a result of torque changes or otherwise, the engine may oscillate with a variable frequency about its longitudinal axis, or may reciprocate in a fore and aft motion along the same axis. Such motions may occur independently or simultaneously, and, if transmitted to the clutch pedal, set up a vibration or chatter in the pedal that will not only be extremely annoying to the occupants of the vehicle, but, will, additionally, cause excessive wear in all the associated linkage. In the present invention the transmission of such objectionable vibrations through the control mechanism is avoided by providing for the dissipation thereof before they reach the clutch pedal in a manner hereinafter explained.

To accomplish the dissipation of such objectionable vibrations, the clutch control mechanism is provided with a plurality of strategically located loosely mounted connecting elements that permit an actuating force of a given magnitude to be transmitted therethrough, but provide a sufficient excess of clearance therein to dissipate vibrations of lesser amplitude from creeping therethrough in the opposite direction; thus providing in effect a unidirectional motion transmitting device. As previously noted, the pin 62 is loosely mounted both in the link 63 and in the connecting yoke member 61 as shown at 62a. Furthermore, the arms of the yoke 61 which straddle the curved link 63 are excessively spaced as shown at 62b, thus permitting a universal and endwise movement of said link, together with its holding pin 62, without effecting movement of said yoke member 61.

On the opposite end of this interconnection the yoke 58, pin 57, and crank arm 55 are similarly loosely mounted as shown at 57a and 57b to provide universal and endwise movement and thus further dissipate small vibrations. Continuing further along this connecting control mechanism the shaft 32 is likewise loosely mounted in the bracket 35, which, being affixed to the housing 14, will naturally respond to all movements of the resiliently mounted power plant. Although the movement of this bracket may offset slightly the accumulated dissipating effect of the linkage between the shaft 32 and the clutch throw-out shaft 64, this is otherwise compensated for as will be later explained. Proceeding further, it will be noted the opposite end of the shaft 32 is also loosely positioned in the aperture 33, in the hub portion of pedal member 29, and that the link 37 affixed thereto is loosely positioned over the pin 38, fixedly mounted in said clutch pedal member 29.

Under normal operating conditions any vibrations set up as a result of oscillation, or fore and aft thrust, of the vehicle power plant will be dissipated in this loosely connected linkage before such vibrations reach the clutch pedal. However, the magnitude of such vibrations may frequently be greater than can be satisfactorily dissipated by these loosely mounted lost-motion linkage members. When this occurs, the shaft 32 may either flex, or move slightly out of position. For instance, if the end of the shaft 32, mounted in the bracket 35, should be forced out of its normal axial position in the tubular sleeve 27, it will pivot in a more or less universal or nutating action about a fulcrum on the marginal edge of the aperture 33, in the hub section of pedal member 29, and move the loosely mounted link 37, either angularly or along the periphery of the pin 38 and away from said pedal member, without disturbing in any manner the position of said pedal member.

In rare instances, it is conceivable that the magnitude of the power plant vibrations may exceed that which can be satisfactorily dissipated in the above manner. On such occasions the shaft 32 may be forced to bend, but, since the ratio of its unsupported length with respect to its diameter is quite large, such flexing would cause no appreciable disturbance in the clutch pedal, and, furthermore, would cause no harmful reaction either in the shaft or its associated linkage assembly.

It will be appreciated, therefore, from a study of the above specifications and description of operation that the present invention provides a simple and novel mechanism for transmitting positive control motion from a clutch pedal member to a clutch disengaging member, disposed within a resiliently mounted power plant, and simultaneously therewith prevents any oscillatory or fore and aft thrusts of said disengaging member from being transmitted to the clutch pedal member.

Although only a preferred form of the invention has been described and illustrated it will be apparent to those skilled in the art that various modifications may be made therein without departing from the spirit of the invention or from the scope of the appended claims.

What is claimed is:

1. In a vehicle having a frame and an engine yieldably mounted therein and including a clutch, and a clutch operating mechanism, the combination, comprising: a clutch control member; a support for mounting said control member for angular movement on the frame; said support including, a bracket mounted on the frame, and a tubular sleeve fixedly mounted within said bracket and adapted for rotatably supporting said control member; a clutch operating member carried by the engine; means connecting the clutch control member with the clutch operating member including, a shaft extending transversely of the frame and disposed axially within said tubular sleeve, means for supporting the shaft for universal and endwise movement including means loosely and rotatably connecting one end of the shaft to said control member for movement of the shaft about said end as a fulcrum, and lost motion means including a series of loosely connected articulated link members connecting the other end of said shaft to said operating member for transmitting angular movement of said control member through the shaft to said operating member.

2. The invention defined in claim 1 further characterized by having: the support for the clutch control member project through the frame, and having the clutch control member mounted outside the outer vertical face of the frame.

3. The invention defined in claim 1 and further characterized by having: spring means cooperating between said tubular sleeve and said shaft for limiting the endwise movement of said shaft.

4. The invention defined in claim 1 further characterized by having: the transversely extending shaft, which is disposed axially within said tubular sleeve, spaced therefrom.

5. The invention defined in claim 1 further characterized by: said shaft supporting means also to include a bracket carried by the engine and adapted to loosely and rotatably support the clutch operating end of the transversely extending shaft.

6. In a vehicle having a frame and an engine yieldably mounted therein and including a clutch, and a clutch operating mechanism, the combination, comprising: a clutch pedal control member; a support for mounting said control member for angular movement on the frame; said support including, a bracket mounted on the frame, and a tubular sleeve fixedly mounted within said bracket and adapted for rotatably supporting said control member; a clutch operating member carried by the engine; means connecting the clutch pedal control member with the clutch operating member including, a shaft extending transversely of the frame and disposed axially within said tubular sleeve, means for supporting the shaft for universal and endwise movement including means loosely and rotatably connecting one end of the shaft to said control member for movement of the shaft about said end as a fulcrum, and lost motion means including a series of loosely connected articulated link members connecting the other end of said shaft to said operating member for transmitting angular movement of said control member through the shaft to said operating member.

JOSEPH A. HAUSMANN.
EARL T. RIEDY.

REFERENCES CITED

The following references are of record in the file of this patent:

UNITED STATES PATENTS

| Number | Name | Date |
| --- | --- | --- |
| 1,464,905 | Grafenstatt | Aug. 14, 1923 |
| 1,909,423 | Pfeiffer et al. | May 16, 1933 |
| 1,943,849 | Swennes | Jan. 16, 1934 |
| 1,954,234 | Zimmermann | Apr. 10, 1934 |
| 2,097,203 | Wemp | Oct. 26, 1937 |
| 2,296,535 | Nutt | Sept. 22, 1942 |
| 2,297,913 | Phelps | Oct. 6, 1942 |